No. 766,991. PATENTED AUG. 9, 1904.
A. CHURCHWARD.
PROPELLING RAILWAY CARS BY SYNCHRONOUS ELECTRIC MOTORS.
APPLICATION FILED OCT. 11, 1902.
NO MODEL.
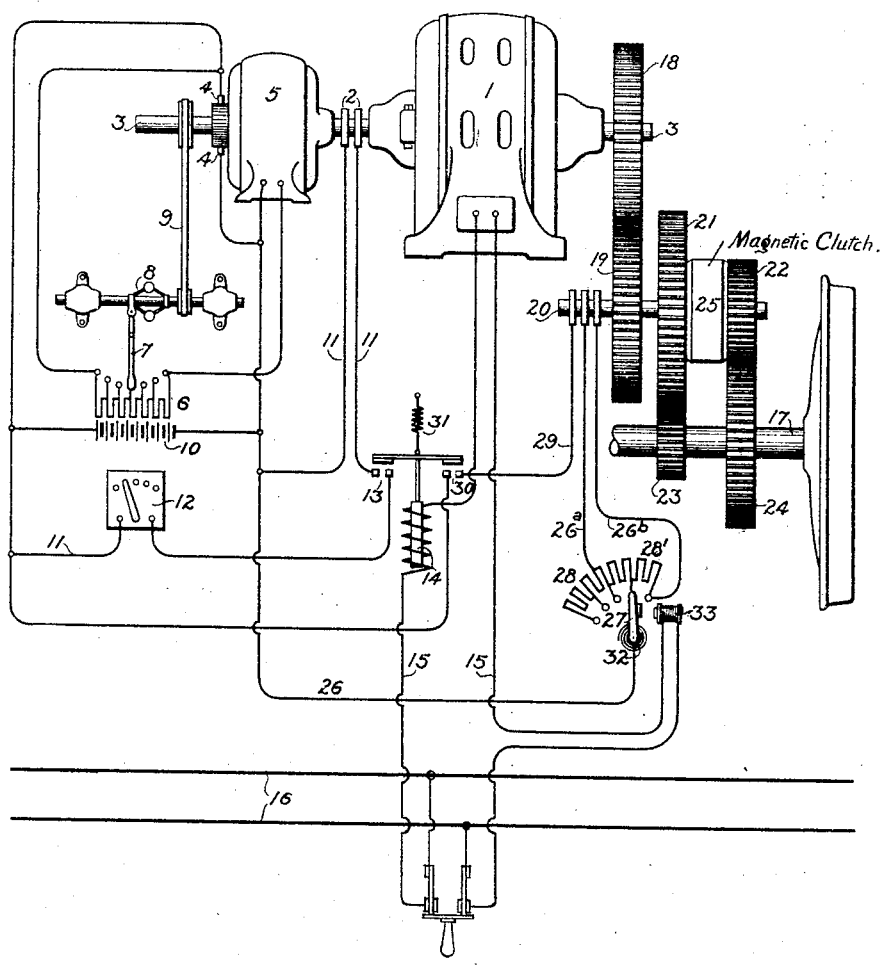
Witnesses.
Inventor.
Alexander Churchward.
by Albert G. Davis
Att'y.

No. 766,991. Patented August 9, 1904.

UNITED STATES PATENT OFFICE.

ALEXANDER CHURCHWARD, OF NEW YORK, N. Y., ASSIGNOR TO GENERAL ELECTRIC COMPANY, A CORPORATION OF NEW YORK.

PROPELLING RAILWAY-CARS BY SYNCHRONOUS ELECTRIC MOTORS.

SPECIFICATION forming part of Letters Patent No. 766,991, dated August 9, 1904.

Application filed October 11, 1902. Serial No. 126,900. (No model.)

*To all whom it may concern:*

Be it known that I, ALEXANDER CHURCHWARD, a citizen of the United States, residing at New York, county of New York, State of New York, have invented certain new and useful Improvements in Propelling Railway-Cars by Synchronous Electric Motors, of which the following is a specification.

This invention relates to electric railways; and its object is to utilize alternating currents for propelling the cars. It has been proposed to use induction-motors for this purpose; but a serious disadvantage of the induction-motor in railway-work is its small air-gap, which prohibits its use except under the most favorable circumstances, since if the air-gap is widened so as to give the clearance necessary for universally successful operation the power factor is reduced, the leakage-current being then very heavy. A synchronous motor, on the other hand, can be efficiently operated with a large air-gap, as the extra field-current necessitated by the larger air-gap is but a small percentage of the whole and is hardly noticeable in the total efficiency of the machine. The synchronous motor, however, has little or no starting torque and must be artificially run up to synchronous speed before being switched into circuit and the load thrown on. In using such a motor for propelling a railway-car means must be provided for starting the motor and speeding it up until it is in step with the generator before it is mechanically connected with the car-axle. Moreover, means must be provided for varying the speed of the car independently of the speed of the motor (which remains practically constant) and for keeping the motor running while the car is making a short stop or when the line-current fails or the trolley is not in contact with the working conductor. Furthermore, if two or more synchronous motors are connected with the same supply-circuit and the load on one of them is quite variable and its field is not changed to meet such changing conditions a pumping effect is liable to take place in the other motors unless special provision is made to meet it. When the load changes, the power factor also changes, because the variation in load causes the current to lead or lag, and this requires a readjustment of the field to correct it. My invention aims to provide for all these requirements and to produce an organized combination of mechanism and circuits by means of which a synchronous alternating-current motor can be utilized for propelling a railway-car.

The invention consists in the construction and arrangement of parts hereinafter described, and particularly pointed out in the claims.

The accompanying drawing is a diagram of circuits and mechanism embodying my invention.

The synchronous motor 1 is of the revolving field-magnet type, direct current being led to its field-coils through the collector-rings 2 on its shaft 3 from the terminals 4 of a shunt-wound exciter 5, whose armature is driven by the synchronous motor 1. In the shunt-field circuit of the exciter is a rheostat 6, whose switch-arm 7 is automatically shifted to maintain a constant potential at the terminals 4. This is preferably accomplished by a centrifugal governor 8, suitably driven from the shaft 3, as by a belt 9. In shunt to the exciter-terminals 4 is a storage battery 10. The leads 11, which convey current to the collector-rings 2, include a rheostat 12 and a switch 13, the latter being controlled by a sucking-solenoid 14 in one of the leads 15, conveying alternating current from the mains 16 to the stationary armature of the synchronous motor. The shaft of said motor is geared to the car-axle 17 by speed-changing gearing, preferably constructed as follows: The spur-gear 18 is fixed on the motor-shaft and meshes with a gear-wheel 19 on the counter-shaft 20, on which are loosely mounted the spur-gear 21 and the pinion 22, which mesh respectively with the pinion 23 and the spur-gear 24, keyed on the car-axle. Electromagnetic clutches 25 enable either the spur-gear 21 or the pinion 22 to be clutched to the counter-shaft. When the pinion is clutched, the motor will drive the car slowly. When the spur-gear is clutched, the car will be driven faster. The clutches are supplied with direct current from the exciter 5 through a lead 26, which can be put in circuit with either clutch through a switch-arm 27, and two branch leads 26ª 26ᵇ, leading, respectively, to the clutch for the pinion 22 and that for the spur-gear 21. The switch-arm 27 is arranged to cut out a resistance 28 in circuit with the lead 26ª and a resistance 28' in circuit with the lead 26ᵇ, passing without break from one to the other, and thus clutching first the pinion 22 and then the gear 21 with increasing strength in each case. The clutches are preferably friction-clutches to permit a certain amount of slip until the full current strength is applied. The common return-lead 29 for the two clutches has a switch 30, controlled by the solenoid 14. A spring 31 keeps this switch and the field-circuit switch 13 open so long as no alternating current is supplied to the motor-armature. A spring 32 returns the switch-arm 27 to the "off" position when the main circuit is broken and the series holding-coil 33 in said circuit is deenergized.

The operation of my invention is as follows: To start the car, the exciter is run as a shunt-motor taking current from the battery, the centrifugal governor being adjusted to regulate its maximum speed to correspond with the synchronous speed of the main motor. When this speed has been attained, the armature-circuit of the main motor is closed, thereby energizing the solenoid 14 and closing the switches 13 and 30. The field-coils of the main motor being thus supplied with current from the battery, the main motor falls into step and begins to drive the exciter as a generator, supplying direct current to the field-circuit, the battery, and the clutch-circuit. Up to this time the car has been standing still, the clutches not being energized. The motor-man now turns the switch-arm 27 to the first contact of the resistances 28, and the pinion 22 is clutched to the rotating counter-shaft. Owing to the slip of the clutch when weakly energized, the car will start slowly, and as its speed accelerates the switch-arm is moved from point to point of the resistances 28 28' until finally the spur-gear 21 is rigidly clutched to the counter-shaft and the car is running at full speed. If for any reason the main circuit should be broken, the spring 31 at once opens the field-circuit of the main motor and the clutch-circuit. The exciter, however, is kept running at full speed by the battery-current and maintains the synchronous motor at the proper speed until the main circuit is closed, which will automatically close the field-circuit at the switch 13, and the motor will thus fall into step again without any hitch or jar. When the main circuit opens, the switch-arm 27 automatically goes to the off position, so that on the closing of the main circuit the motor will run free until the motorman closes the clutch-circuit again.

It thus appears that my invention provides for successfully starting and running a railway-car by means of a synchronous alternating-current motor for varying the speed of the car and for varying the field excitation to maintain a unity power factor and for keeping the motor running when the main circuit is opened accidentally.

What I claim as new, and desire to secure by Letters Patent of the United States, is—

1. The combination with a synchronous alternating-current electric motor, of an exciter mechanically connected therewith and electrically connected with the field-circuit thereof, a storage battery in shunt to said field-circuit, and a switch in said field-circuit controlled by the closing of the armature-circuit.

2. The combination with a synchronous alternating-current electric motor, of an exciter mechanically connected therewith, and electrically connected with the field-circuit thereof, an automatic regulator in the field-circuit of said exciter, a storage battery in shunt to the field-circuit of the motor, and a switch in said motor field-circuit adapted to be closed with the closing of the motor armature-circuit.

3. The combination with a synchronous alternating-current electric motor, of a shunt-wound exciter mechanically connected therewith and in circuit with the field-coils thereof, an automatic regulator in the field-circuit of said exciter, a storage battery in shunt to the motor field-circuit, a rheostat in said motor field-circuit, and a circuit-closer in said motor field-circuit electrically operated with the closing of the motor armature-circuit.

4. The combination with a synchronous alternating-current electric motor, of a field-circuit exciter driven thereby, a storage battery connected across the terminals of said exciter, speed-gearing driven by said motor, and electromagnetic clutches for said gearing in circuit with the exciter.

5. The combination with a synchronous alternating-current electric motor, of a field-circuit exciter driven thereby, a storage battery connected across the terminals of said exciter, speed-gearing driven by said motor, electromagnetic clutches for said gearing in circuit with the exciter, and an electromagnetic switch in the motor armature-circuit controlling the circuits of the motor-field and the clutches.

6. The combination with a synchronous alternating-current electric motor, of a field-circuit exciter driven thereby, a storage battery connected across the terminals of said exciter, speed-gearing driven by said motor, electromagnetic clutches for said gearing in circuit with the exciter, and a current-controller for varying the strength of said clutches.

7. The combination with a synchronous alternating-current electric motor, of a field-circuit exciter driven thereby, a storage battery connected across the terminals of said exciter, a counter-shaft geared to said motor, a loose pinion and a loose gear on said shaft, electromagnetic clutches for connecting said pinion and gear with said shaft, and a current-controller arranged to clutch first the pinion and then the gear.

8. The combination with a synchronous alternating-current electric motor, of a field-circuit exciter driven thereby, a storage battery connected across the terminals of said exciter, a counter-shaft geared to said motor, a loose pinion and a loose gear on said shaft, electromagnetic clutches for connecting said pinion and gear with said shaft, a current-controller arranged to clutch first the pinion and then the gear, and an electric circuit-closer controlled by the closing of the motor armature-circuit and operating to close the motor field-circuit and the clutch-circuit simultaneously.

9. The combination with a synchronous alternating-current electric motor, of a field-circuit exciter driven thereby, a storage battery connected across the terminals of said exciter, a counter-shaft geared to said motor, a loose pinion and a loose gear on said shaft, electromagnetic clutches for connecting said pinion and gear with said shaft, a current-controller arranged to clutch first the pinion and then the gear, and means for automatically returning said controller to the "off" position when the motor armature-circuit is opened.

In witness whereof I have hereunto set my hand this 9th day of October, 1902.

ALEXANDER CHURCHWARD.

Witnesses:
G. T. BRIDGMAN,
L. C. FOSS.